June 25, 1929.  L. K. MARSHALL  1,718,748
TEMPERATURE REGULATION
Filed Nov. 22, 1923

Inventor:
Laurence K. Marshall,
by Roberts, Roberts & Cushman,
attys.

Patented June 25, 1929.

1,718,748

UNITED STATES PATENT OFFICE.

LAURENCE K. MARSHALL, OF WEST SOMERVILLE, MASSACHUSETTS, ASSIGNOR TO SPENCER THERMOSTAT CO., OF CAMBRIDGE, MASSACHUSETTS, A CORPORATION OF MASSACHUSETTS.

TEMPERATURE REGULATION.

Application filed November 22, 1923. Serial No. 676,300.

This invention relates to the production of suitable responses to temperature changes and particularly to the control of temperature in accordance with these responses.

Heretofore it has been common practice to accurately adjust temperature responsive devices such as thermostats in order to render them relatively sensitive to small changes of temperature. However, when constructed for such adjustment they are unsuitable for performing operations requiring appreciable physical displacement or expenditure of energy, owing to the relatively small movement taking place and the small amount of energy available in temperature responsive devices when small temperature changes occur. The minuteness of the maximum physical movement taking place within a delicately adjusted responsive device such as a thermostat limits the capacity of the device positively to actuate apparatus. Delicate adjustment is further objectionable on account of the consequent unreliability of operation of the device, inasmuch as very slight changes in the conditions of the device or of the apparatus operated thereby destroy the initial delicate adjustment.

On the other hand if the temperature responsive device be made relatively large and rugged and be given a coarse adjustment so that a relatively large physical movement occurs when the device operates, the upper temperature at which the device operates is relatively remote from the lower temperature at which it operates, and the device is accordingly unsuitable to respond directly to changes temperature with the proper degree of sensitivity.

Many kinds of apparatus, such as electrical switches for example, require relatively large physical displacement of the parts such as contacts, particularly in the case of switches when large quantities of electric energy are to be controlled. While the physical displacement taking place in a delicately adjusted thermostat may be mechanically amplified to a certain extent, the frictional losses and other difficulties limit the extent to which this expedient can be satisfactorily carried, the limit being considerably below that required for the operation of electrical contacts to interrupt relatively large amounts of power. Even when a plurality of contacts are arranged to operate in series to increase the total gap in the circuit, the advantage gained is limited and is not adequate to produce the requisite gap in a circuit in response to the small change of temperature within which the temperature responsive device should operate. A delicately adjusted thermostat is therefore unsuitable for directly operating such apparatus.

Objects of the present invention are to overcome the above difficulties, to provide an improved method of operating temperature responsive and temperature regulating apparatus, to provide temperature responsive apparatus of simple construction capable of positively producing a large abrupt response to a predetermined small change of temperature and adapted to operate electrical contacts to interrupt relatively large amounts of power without arcing, and generally to provide temperature responsive and temperature regulating apparatus of improved form and improved operating characteristics.

In accordance with the present invention a temperature responsive device having a given sensitivity is controlled by another more sensitive temperature responsive device which controls the operation of the first device by effecting a change in its temperature. In another aspect the invention contemplates regulating the temperature of a body or medium by a temperature responsive device the temperature of which is in part at least controlled by a second device responsive to temperature changes in the body or medium.

The invention will now be described, in connection with a specific embodiment with particular reference to the accompanying drawings, in which.

Figure 1:
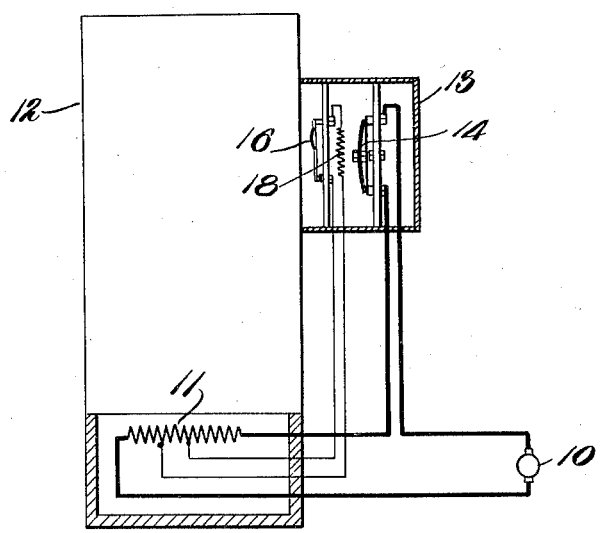
Fig. 1 is a diagrammatic elevation partly in section of an embodiment of the invention.
Figure 3:
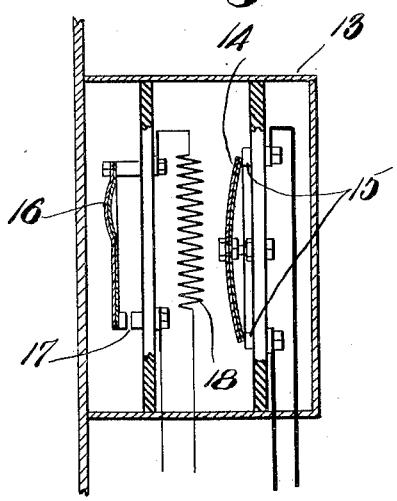
Fig. 3 is an enlarged vertical section of a portion of the apparatus taken along the line 3—3 of Fig. 2.
Figure 2:
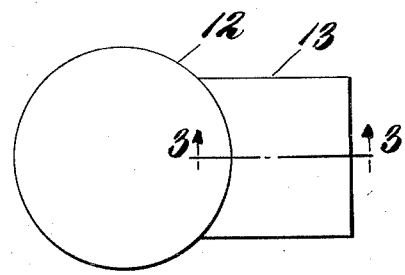
Fig. 2 is a plan of Fig. 1.

In Fig. 1, a source of electric energy 10 supplies current to the heating resistance element 11 for the boiler 12. The control device 13 is positioned in heat transfer relation with boiler 12 so as to be exposed to those changes in the temperature of the boiler which are to be controlled or which are to produce a desired response. The thermostat 14 comprising an elastic bimetallic disc, having the form of a shollow cup, is fixed in position at its center and has a free edge which abruptly engages contacts 15 to close the circuit between source 10 and resistance 11 when the temperature in decreasing reaches a predetermined low value, and abruptly opens the contacts to interrupt the transmission of power from the source 10 to resistance 11 when the temperature in increasing reaches a predetermined high value, the thermostat being of the quick or "snap" action type more fully disclosed in the patent to Spencer No. 1,448,240, although any other suitable form of thermostat may be employed. Thermostat 14 may be relatively large and rugged in construction and adjusted abruptly to produce a wide separation between the disc and the contacts when the thermostat operates in response to an excessive temperature.

An auxiliary thermostat 16 is housed within control chamber 13 adjacent boiler 12, and responds to a predetermined increasing temperature less than that of thermostat 14 to close contacts 17 and connect a relatively small heating resistance 18 in shunt to a portion of resistance 11 so that current from the source 10 passes through resistance 18 when contacts 15 are closed and rapidly heats thermostat 14. Chamber 13, housing elements 14, 16, and 18, unites these elements in a unitary structure.

For example, if the upper operating temperature of thermostat 14 be 500° C., and the lower or cold operating temperature be 300° C., while the upper opreating temperature of thermostat 16 is, say, 325° C., and the lower operating temperature is 300° C., it will be seen that as long as power is being delivered to resistance 11 to maintain boiler 12 between 300° C. and 325° C., thermostat 14 will tend to maintain contacts 15 closed and thermostat 16 will tend to maintain contacts 17 open. However, when the temperature increases above 325° C., thermostat 16 abruptly closes contact 17 causing heat to be evolved in resistance 18 thereby abruptly to raise the temperature of thermostat 14 until the increasing temperature reaches 500° C., whereupon thermostat 14 abruptly opens contacts 15 disconnecting resistances 11 and 18 from source 10. Disconnection of resistance 18 prevents excessive heating in chamber 13.

The relatively small amount of heat from resistance 18, evolved at a point somewhat remote from boiler 12, produces no appreciable change in the temperature of the boiler, but is sufficient to heat thermostat 14 and in effect indirectly to render the thermostat responsive to vary much smaller changes in the temperature of the boiler than could directly cause the actuation of the thermostat. Thermostat 16 may be smaller and more sensitive than thermostat 14 inasmuch as the power transmitted to resistance 18 may be relatively small as compared to that transmitted to resistance 11. Thermostat 16 in conjunction with resistance 18 and source 10 amplifies the effect of excessive heat in boiler 12 and transmits the amplified heat to thermostat 14.

In case the body 12 were a room within which the air was to be maintained between the temperatures of 65° F. and 70° F., the sensitive thermostat 16 could be adjusted to close contacts 17 when the temperature increased above 70° F. and to open the contacts again when the temperature decreased below 65° F., whereas thermostat 14 could be roughly adjusted to operate at much more widely separate temperatures as, for example, to open contacts 15 at 90° F. and to close the contacts again at 65° F. In this way relatively large amounts of power could be controlled to maintain the air at a temperature between 65° and 70°.

Many other applications of the invention are obvious, the principle of producing an amplified response to a very limited temperature change and of regulating large amounts of power to maintain the temperature of a body within a narrow temperture range or between two temperatures relatively near to each other on the temperature scale, being of broad application.

I claim:

1. In a heating system, heating means, temperature responsive means for controlling said heating means, and separate temperature responsive means in heat transfer relation to said heating means for separately controlling the operation of said first temperature responsive means, said first and second mentioned temperature responsive means being subjected to substantially like temperature variations, and said temperature responsive means having different operating ranges, and controlling different amounts of energy.

2. In a heating system, heating means, temperature responsive means for controlling said heating means, and physically separate temperature responsive means in heat transfer relation to said heating means for separately controlling the operation of said first temperature responsive means, said separate responsive means being more sensitive to changes of temperature than said first responsive means, and subjected to substantially like temperature changes, and controlling different amounts of energy.

3. In a heating system, a body to be heated, means to heat said body, means responsive to changes in the temperature of said body for controlling the heat supplied thereto and determining the minimum temperature thereof, separate heating means for heating said responsive means, and responsive means physically separate from said first responsive means for separately controlling said separate heating means in response to changes in the temperature of said body.

4. In a heating system, a body to be heated, means to heat said body, means responsive to changes in the temperature of said body for controlling the heat supplied thereto, separate heating means for heating said responsive means, and separate responsive means for controlling said separate heating means independently of said first heating means in response to changes in the temperature of said body, said separate responsive means being more sensitive to changes of temperature than said first named responsive means, and subjected to substantially like temperature changes, and controlling different amounts of energy.

5. In a heating system, a body to be heated, an electrical heating element to heat said body, means responsive to changes in the temperature of said body for controlling the heat supplied thereto by said heating element and determining one temperature limit thereof, a separate heating element for heating said responsive means, and separate responsive means for controlling said separate heating element independently of said first heating means in response to changes in the temperature of said body, said temperature responsive means controlling different amounts of energy.

6. In a heating system, a body to be heated, means to heat said body, a thermostat responsive to changes in the temperature of said body for controlling the heat supplied thereto, separate heating means for heating said thermostat, and a separate thermostat for controlling said separate heating means independently of said first heating means in response to changes in the temperature of said body, said thermostat being subjected to substantially like temperature changes and controlling different amounts of energy.

7. In a heating system, a body to be heated, means responsive to a predetermined decreasing temperature of said body to cause heat to be supplied to said body, separate means responsive to a predetermined increasing temperature for causing heat to be supplied to said first means, said first means being responsive to heat from said separate means for discontinuing the supply of heat to said body, said temperature responsive means controlling different amounts of energy.

8. In a heating system, a body to be heated, an electrical heating resistance for said body, a source of electric energy for said resistance, means responsive to a predetermined decreasing temperature of said body for connecting said source to said resistance, a separate heating resistance for said responsive means, and separate means for connecting said source to said separate resistance to heat said first responsive means to cause it to disconnect said source from said first heating resistance, said temperature responsive means and separate connecting means controlling different amounts of energy.

9. In apparatus of the character described, temperature responsive means, and separate means responsive to temperature changes of smaller range than said first means for separately causing said first means to abruptly operate, said means both being subjected to like temperature ranges.

10. In apparatus of the character described, temperature responsive means having predetermined operating temperatures, means adjacent said responsive means to vary the temperature thereof, and separate temperature responsive means having predetermined operating temperatures nearer together on the temperature scale than those of said first mentioned responsive means for separately controlling said temperature varying means, said two temperature responsive means being subjected to substantially the same temperature variations, and controlling different amounts of energy.

11. A thermostatic device comprising a thermostat and means responsive to adjacent temperatures for rapidly varying the temperature of the thermostat in one direction when the adjacent temperature passes a predetermined value in the same direction.

12. The method of actuating a thermostat having appreciably different predetermined hot and cold actuating temperatures which comprises abruptly applying heat to said thermostat when the temperature in rising exceeds said cold value and reaches a value appreciably less than said hot value.

13. In apparatus of the character described, temperature responsive means abruptly operating at relatively widely spaced temperatures, and separate means responsive to temperature changes of smaller range than said first means for separately causing said first means to abruptly operate said temperature ranges coinciding at one end thereof.

14. In apparatus of the character described, a body to be heated, temperature responsive means abruptly operating at relatively widely spaced temperatures and constituting controlling means for said body and determining one temperature limit thereof, and separate means responsive to temperature changes of smaller range than said first means for separately causing said first means to abruptly operate when said body is at a temperature nearer said temperature limit than the difference between said widely spaced temperatures, said temperature ranges coinciding at one end thereof.

15. A heat transfer regulator for regulating the temperature of a body comprising a thermostatic heat transfer controller for controlling the temperature of said body, auxiliary heat transfer means associated with said thermostatic controller for controlling its temperature, and an auxiliary thermostat responsive to the temperature of said body for regulating said auxiliary heat transfer means independently of the main thermostat, said auxiliary thermostat and thermostatic controller having different temperature ranges and controlling different amounts of energy.

16. A heat transfer regulator for regulating the temperature of a body comprising a thermostatic heat transfer controller for controlling the temperature of said body, auxiliary heat transfer means associated with said thermostatic controller for controlling its temperature, and an auxiliary thermostat responsive to the temperature of said body for regulating said auxiliary heat transfer means independently of the main thermostat, said auxiliary thermostat having a shorter temperature range than the thermostatic controller and controlling different amounts of energy.

17. A heat transfer regulator for regulating the temperature of a body comprising a thermostatic heat transfer controller for controlling the temperature of said body, auxiliary heat transfer means associated with said thermostatic controller for controlling its temperature, and an auxiliary thermostat responsive to the temperature of said body for regulating said auxiliary heat transfer means independently of the main thermostat, said auxiliary thermostat tending in a direction to increase the temperature of the thermostatic controller while the thermostatic controller is tending in a direction to decrease the temperature of said body, said thermostats controlling different amounts of energy.

18. A heat transfer regulator for regulating the temperature of a body comprising a thermostatic heat transfer controller for controlling the temperature of said body, auxiliary heat transfer means associated with said thermostatic controller for controlling its temperature, and an auxiliary thermostat responsive to the temperature of said body for regulating said auxiliary heat transfer means independently of the main thermostat, said auxiliary thermostat functioning to control said auxiliary heat transfer means at one time and said thermostatic controller functioning to control the temperature of said body at a later time, said thermostats controlling different amounts of energy.

19. A heat transfer regulator for regulating the temperature of a body comprising two thermostats constructed to move to open and closed positions at predetermined temperatures respectively, and means responsive to one thermostat while the other thermostat is stationary for affecting the other thermostat, one thermostat tending toward one of said positions during an interval when the other thermostat is tending toward the opposite of said positions.

20. A heat transfer regulator for regulating the temperature of a body comprising two thermostats constructed to move to open and closed positions at predetermined temperatures respectively, and a heater responsive to one thermostat independently of the other thermostat for heating the other thermostat, one thermostat tending to close during a period when the other thermostat is tending to open during each cycle of operations.

21. A heat transfer regulator for regulating the temperature of a body comprising two thermostats constructed to move to open and closed positions at predetermined temperatures respectively and having different temperature ranges, one thermostat being normally open and the other normally closed.

22. A heat transfer regulator for regulating the temperature of a body comprising two thermostats constructed to move to open and closed positions at predetermined temperatures respectively and having different temperature ranges, one thermostat being normally open and the other normally closed, and means conjointly controlled by said thermostats for controlling the temperature of said body.

23. A heat transfer regulator for regulating the temperature of a body comprising main and auxiliary thermostats constructed to move to open and closed positions, the main thermostat being cupped to snap abruptly from one position to the other to control the temperature of said body and having a relatively wide temperature range, the auxiliary thermostat having a relatively narrow temperature range and being responsive to the temperature of said body, and auxiliary heat transfer means controlled by the auxiliary thermostat independently of the main thermostat for controlling the main thermostat.

24. In a heating system, a main thermostat in heat-transfer relation to the body to be heated and having means for controlling the temperature of the body, and an auxiliary thermostat in heat-transfer relation to said body and having switch contacts for controlling the temperature of the main thermostat, current through said contacts being controlled by the main thermostat so that current through the contacts is discontinued by the main thermostat and the discontinuity is maintained until after the auxiliary contacts have been separated by the auxiliary thermostat in each cycle of operation, whereby no arcing can occur at the auxiliary contacts and the auxiliary thermostat and contacts may therefore be constructed more delicately.

25. A thermostatically controlled system comprising main and auxiliary thermostats, switching means controlled by each, and means operatively connecting the two thermostats whereby the auxiliary switch never opens a live circuit although controlling the main thermostat.

26. A unitary thermostatic controlling device comprising two thermostats, heating means located near both thermostats and controlled by one thermostat for operating the other thermostat, said heating means keeping the controlling thermostat firmly in its position.

27. A unitary thermostatic controlling device comprising a main thermostat adapted to control the energy supplied to a body, an auxiliary thermostat and auxiliary heater in heat transfer relation to said main thermostat and said body, said auxiliary thermostat controlling the auxiliary heater, which in turn controls the main thermostat, said auxiliary heater, after being energized by said auxiliary thermostat serving to maintain said auxiliary thermostat in its position until the main thermostat operates.

28. A unitary thermostatic controlling device comprising a main thermostat adapted to control the energy supplied to a body, an auxiliary thermostat and heating coil in heat transfer relation to said main thermostat and said body, electrical contacts in the heating coil circuit controlled by said auxiliary thermostat, said heating coil adapted to cause the main thermostat to operate, and to keep the auxiliary thermostat firmly in its energizing position when energized by said auxiliary thermostat.

29. A unitary thermostatic controlling device comprising a main thermostat adapted to control the energy supplied to a body, an auxiliary thermostat and heating coil in heat transfer relation to said main thermostat and said body, electrical contacts in the heating coil circuit controlled by said auxiliary thermostat, said auxiliary thermostat adapted to operate at a predetermined higher temperature to close the heating coil circuit, said heating coil adapted to cause the main thermostat to operate and to keep the auxiliary thermostat firmly in its energizing position up to the time said main thermostat operates.

30. The device of claim 29 wherein the main thermostat controls the energy supplied to said heating coil in addition to the control exercised by the auxiliary thermostat.

31. A unitary thermostatic controlling device comprising a main thermostat adapted to control the energy supplied to a body, an auxiliary thermostat in heat transfer relation to said body, a heating coil in heat transfer relation to both thermostats, said heating coil being immediately controlled by said auxiliary thermostat and adapted to control the main thermostat, the energy for said heating coil being part of that controlled by the main thermostat, said heating coil thereby maintaining the auxiliary thermostat firmly in energizing position when itself energized.

32. An electric thermostatic switch assembly comprising a main thermostat and auxiliary thermostat, said main thermostat having contacts and controlling an electric circuit, said auxiliary thermostat having contacts, a heating coil deriving energy from said electric circuit and in heat transfer relation to both thermostats, said auxiliary thermostat contacts controlling the heating coil circuit, said auxiliary thermostat closing the heating coil circuit at a predetermined temperature and energizing it, whereupon said heating coil tends to maintain said auxiliary thermostat in its energizing position while tending to cause said main thermostat to operate.

33. An electric thermostatic switch assembly comprising a main thermostat controlling an electric circuit, a heating coil bridged cross part of said circuit and when energized adapted to control the main thermostat, an auxiliary thermostat controlling the heating coil circuit and adapted to close the heating coil circuit at a predetermined temperature, said heating coil being in heat transfer relation to said auxiliary thermostat and adapted to maintain it in its energizing position.

Signed by me at Cambridge, Mass., this 20th day of November, 1923.

LAURENCE K. MARSHALL.